United States Patent Office 3,410,935
Patented Nov. 12, 1968

3,410,935
METHOD OF MAKING SINTERED PLATINUM-PLASTIC ELECTRODE
Eugene H. Okrent, Middletown, N.J., assignor, by mesne assignments, to the United States of America as represented by the Secretary of the Army
No Drawing. Filed June 8, 1966, Ser. No. 556,831
12 Claims. (Cl. 264—85)

SPECIFICATION

This invention relates in general to the art of making sintered platinum-plastic electrodes and in particular, to the method of making a sintered platinum-polytetrafluoroethylene electrode.

Heretofore, sintered platinum-polytetrafluoroethylene electrodes have been made by mixing suspensions of polytetrafluoroethylene particles in water with platinum black catalyst, then molding the resulting coagulate into an electrode by cold pressing, and then sintering the electrode. A disadvantage met in making the electrodes in the foregoing manner is that when the electrodes are operated on vaporized feeds in direct hydrocarbon fuel cells, the electrodes are flooded by electrolyte and excessive gas rates are required. This results from the fact that the sintering step has to perform the multiple functions of imparting mechanical integrity to the electrode, of adjusting porosity volume, and of wetproofing the electrode.

The general object of this invention is to provide a method of making sintered platinum-polytetrafluoroethylene electrodes in which the aforementioned disadvantage is overcome. A more specific object of this invention is to provide a method of making a highly wetproof sintered platinum-polytetrafluoroethylene electrode suitable for use in direct hydrocarbon fuel cells operating on vaporized feeds wherein the wetproofing is accomplished independently of the sintering step.

It has now been found that the aforementioned disadvantage may be overcome and the foregoing objectives attained by the following method. According to the method of the invention, a sintered platinum-polytetrafluoroethylene electrode is prepared by first making a dispersion of platinum black in water using a small amount of a fluorocarbon or ethylene oxide adduct as a surfactant. The required amount of water dispersed, surfactant free polytetrafluoroethylene emulsion is added to the dispersion and the shear rate and temperature increased to 150° to 212° F. to produce a finely dispersed polytetrafluoroethylene-platinum black coagulant which floats to the surface. The water phase is then decanted and the coagulant is heated to 350° F. under a nitrogen blanket for 5 minutes to reject the surfactant and excess water. The coagulate or precipitate is then molded into an electrode by cold pressing at a pressure of about 500 pounds per square inch using a suitable screen support such as a tantalum screen support. Then, the electrode is sintered at a temperature of about 650° F. under a pressure of about 1100 pounds per square inch for about one minute. The sintered electrode is then released from the mold by using a suitable mold release agent such as graphite powder. By carrying out the separate steps according to the foregoing method, optimization of the mechanical integrity, porosity, and wetproofing is attained.

As the fluorocarbon surfactant in the above described method, the use of perfluoro-n-octyl sulfonic acid is preferred. Similarly, as the ethylene oxide adduct surfactant in the above described method, the use of octyl phenol ethylene oxide is preferred. The fluorocarbon or ethylene oxide adduct is used in an amount of from 2 to 6 weight percent of the platinum black used.

The weight ratio of platinum black to polytetrafluoroethylene particles used is not critical. Very desirable results however, have been obtained where the ratio in weight percent of platinum black to polytetrafluoroethylene particles is 85 to 15. Similarly, very desirable results have been obtained where the polytetrafluoroethylene particles used in the dispersion are 0.1 micron in size.

To produce the platinum black-polytetrafluoroethylene dispersion, a water to platinum black ratio in parts by weight of 120 to 1 to 300 to 1 can be used with a ratio of 150 to 1 being preferred.

The method of making a sintered platinum-polytetrafluoroethylene according to the invention is particularly illustrated in the following example.

Example 0.007 gram of octyl phenol ethylene oxide and 50 milliliters of distilled water are added to 0.323 gram of platinum black and the dispersion stirred for 2 minutes. 0.15 milliliter of a skimmed emulsion of polytetrafluoroethylene containing 0.057 gram of polytetrafluoroethylene in which the polytetrafluoroethylene particles are 0.1 micron in size is then added and the dispersion stirred at a high speed and at a temperature of 150 to 212° F. until coagulation is complete. The excess water is then decanted and the coagulate heated for 4 minutes in a nitrogen atmosphere at 350° F. to reject the remaining surfactant. The coagulant is then spread on a 50 mesh tantalum screen by cold pressing at 500 pounds per square inch to produce a one square inch blank which is then sintered at a temperature of 650° F. and a pressure of 1100 pounds per square inch for 1 minute using a graphite mold release agent. The performance of the prepared electrode on argon vaporized decane using 14.7 molar phosphoric acid as the electrolyte at a temperature of 150° C. is indicated in the following table wherein column A is the current density in milliamperes per square centimeter and wherein column B is the corresponding value of the polarization from decane theory in volts.

TABLE

| Column A | Column B |
|----------|----------|
| 0        | 0.03     |
| 1        | 0.19     |
| 10       | 0.38     |
| 15       | 0.45     |
| 20       | 0.50     |
| 30       | 0.52     |
| 40       | 0.56     |
| 50       | 0.68     |

The foregoing description is to be considered merely as illustrative of the invention and not in limitation thereof.

What is claimed is:
1. The method of forming a sintered platinum-polytetrafluoroethylene electrode comprising adding water dispersed surfactant free polytetrafluoroethylene emulsion to an aqueous dispersion of platinum black and a small amount of a surfactant selected from the group consisting of perfluoro-n-octyl sulfonic acid and octyl phenol ethylene oxide, stirring the mixture at high speed at a temperature of 150 to 212° F. to coagulate the mixture, decanting the excess water, heating the coagulant to a temperature of 350° F. in a nitrogen atmosphere to reject the surfactant and excess water, molding the resulting coagulate into an electrode by cold pressing at a pressure of about 500 pounds per square inch using a tantalum screen support, and sintering the electrode at a temperature of about 650° F. under a pressure of about 1100 pounds per square inch for about one minute and releasing the sintered electrode from the mold.

2. The method according to claim 1 wherein the polytetrafluoroethylene particles are 0.1 micron in size.

3. The method according to claim 1 wherein the ratio in weight percent of platinum black to polytetrafluoroethylene is 85 to 15.

4. The method according to claim 1 wherein the surfactant is perfluoro-n-octyl sulfonic acid.

5. The method according to claim 1 wherein the surfactant is octyl phenol ethylene oxide.

6. The method according to claim 1 wherein the polytetrafluoroethylene particles are 0.1 micron in size, the ratio in weight percent of platinum black to polytetrafluoroethylene particles is 85 to 15, and the surfactant amounts to 2 to 6 weight percent of the platinum black.

7. The method of making a platinum-polytetrafluoroethylene electro catalyst for use in electrode fabrication comprising adding water dispersed surfactant free polytetrafluoroethylene emulsion to an aqueous dispersion of platinum black and a small amount of a surfactant selected from the group consisting of perfluoro-n-octyl sulfonic acid and octyl phenol ethylene oxide, stirring the mixture at high speed at a temperature of 150 to 212° F. to coagulate the mixture, decanting the excess water, and heating the coagulant to a temperature of 350° F. in a nitrogen atmosphere to reject the surfactant and excess water.

8. The method according to claim 7 wherein the polytetrafluoroethylene particles are 0.1 micron in size.

9. The method according to claim 7 wherein the ratio in weight percent of platinum black to polytetrafluoroethylene is 85 to 15.

10. The method according to claim 7 wherein the surfactant is perfluoro-n-octyl sulfonic acid.

11. The method according to claim 7 wherein the surfactant is octyl phenol ethylene oxide.

12. The method according to claim 7 wherein the polytetrafluoroethylene particles are 0.1 micron in size, the ratio in weight percent of platinum black to polytetrafluoroethylene particles is 85 to 15, and the surfactant amounts to 2 to 6 weight percent of the platinum black.

References Cited

UNITED STATES PATENTS

| | | | |
|---|---|---|---|
| 3,248,267 | 4/1966 | Langer et al. | 136—86 |
| 3,305,400 | 2/1967 | Barber et al. | 136—120 |

ROBERT F. WHITE, *Primary Examiner.*

JAMES R. HALL, *Assistant Examiner.*